United States Patent

[11] 3,593,865

[72] Inventors Herman L. Moor
Chicago;
Harold R. Braner, River Grove; Irwin L. Salk, Skokie, all of, Ill.
[21] Appl. No. 882,839
[22] Filed Dec. 8, 1969
[45] Patented July 20, 1971
[73] Assignee Braner Engineering, Inc.
Chicago, Ill.

[54] LIFT MOUNTABLE TO THE BED OF A PICK-UP TRUCK
8 Claims, 7 Drawing Figs.

[52] U.S. Cl. .................................................. 214/86 A, 280/402
[51] Int. Cl. .................................................. B60p 3/12
[50] Field of Search .................................................. 214/86 A; 280/402; 254/139.1

[56] References Cited
UNITED STATES PATENTS
1,690,372 11/1928 Livesay .................. 214/86 A
2,818,984 1/1958 Nims ...................... 214/86 A Primary Examiner—Albert J. Makay
Attorney—Oltsch and Knoblock ABSTRACT: A lift mountable to the bed of a pickup truck including an inverted V-shaped frame member having leg parts each pivotally connected at the free end thereof to the truck bed adjacent and substantially parallel to the rear edge of the bed so as to be pivotal in a fore and aft direction relative to the truck. A second V-shaped frame member extends rearwardly of the truck over the rear edge of the bed thereof and has leg parts each pivotally connected at the free end thereof to a leg part of the inverted V-shaped member. A hydraulic piston and cylinder power unit has one end pivotally connected to the apex of the inverted V-shaped frame member and its other end pivotally connected to the second V-shaped member, adjacent the apex thereof. A tow bar is mounted to the apex of the second V-shaped member. Means are provided for actuating the hydraulic power unit to cause pivotal movement of the second V-shaped member and a shifting of the tow bar.

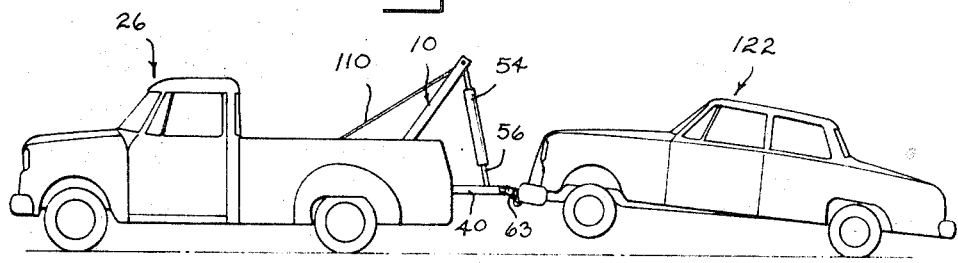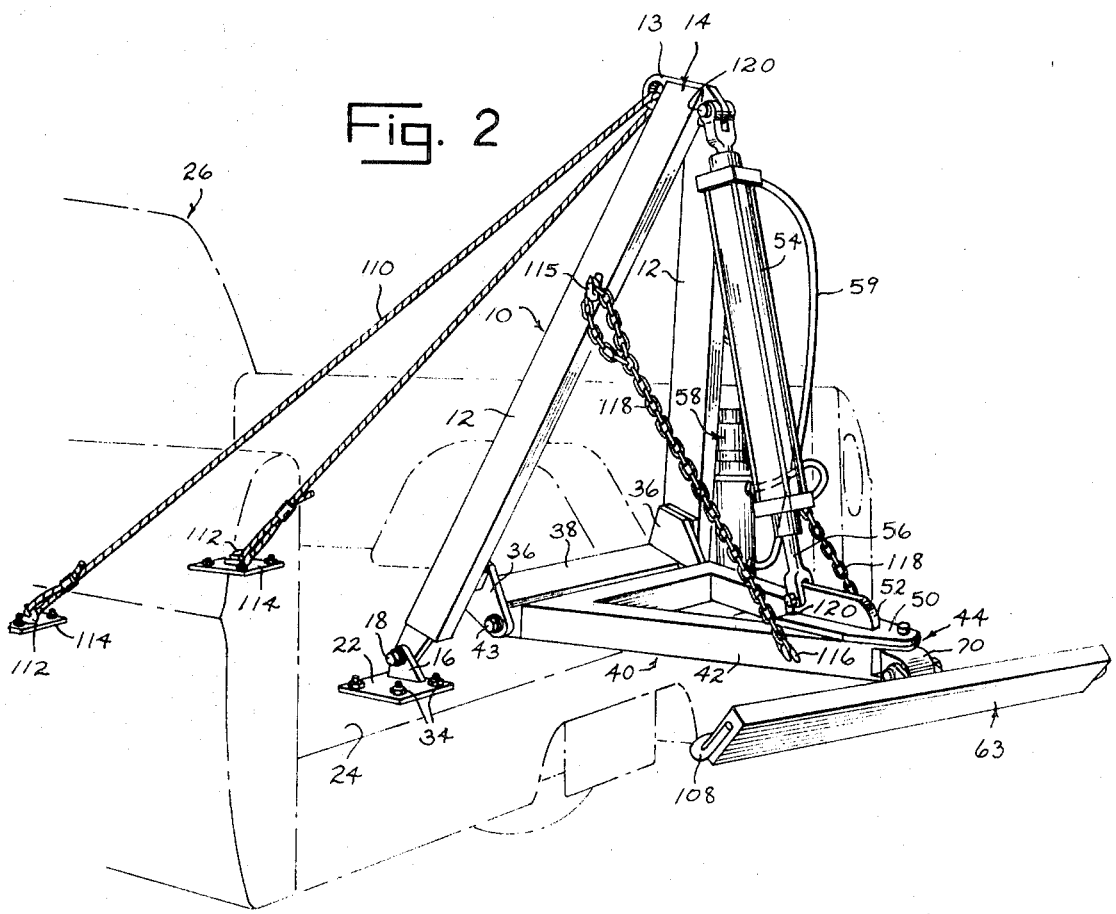

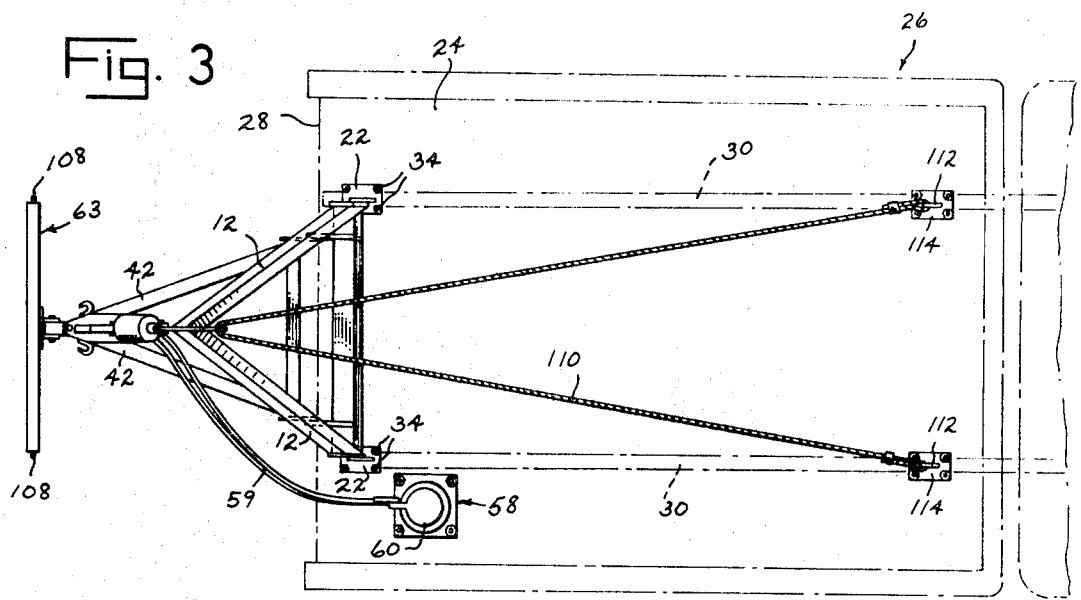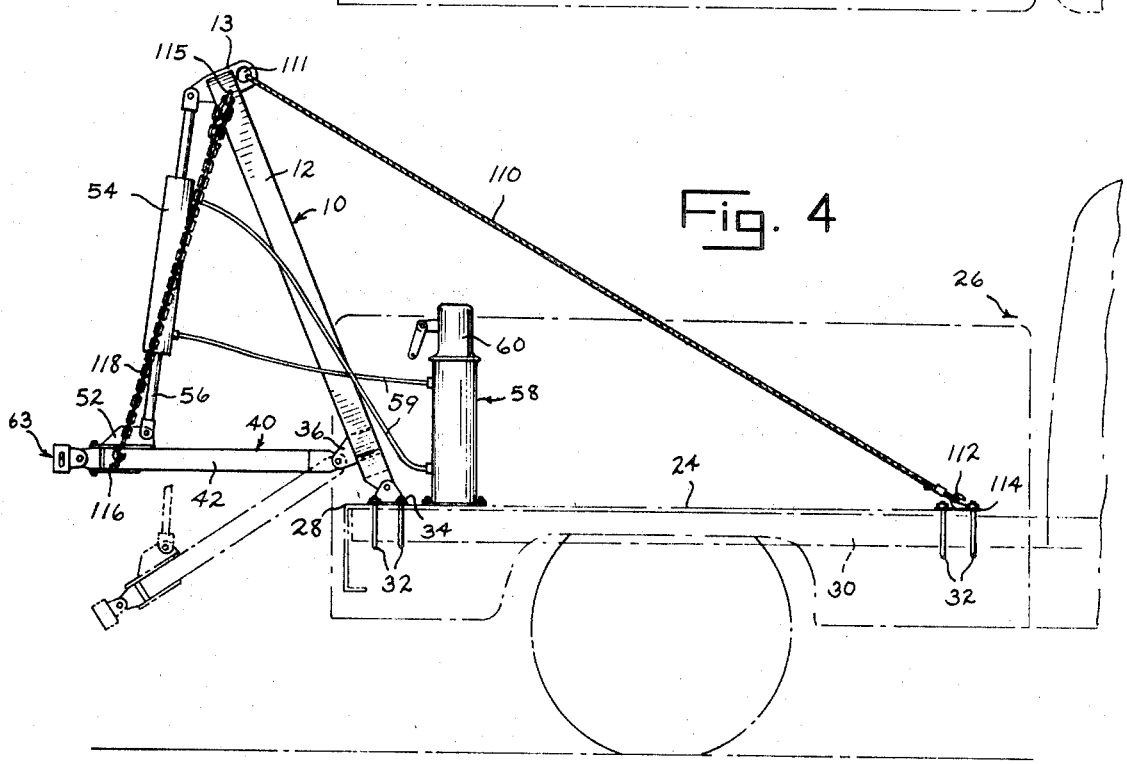

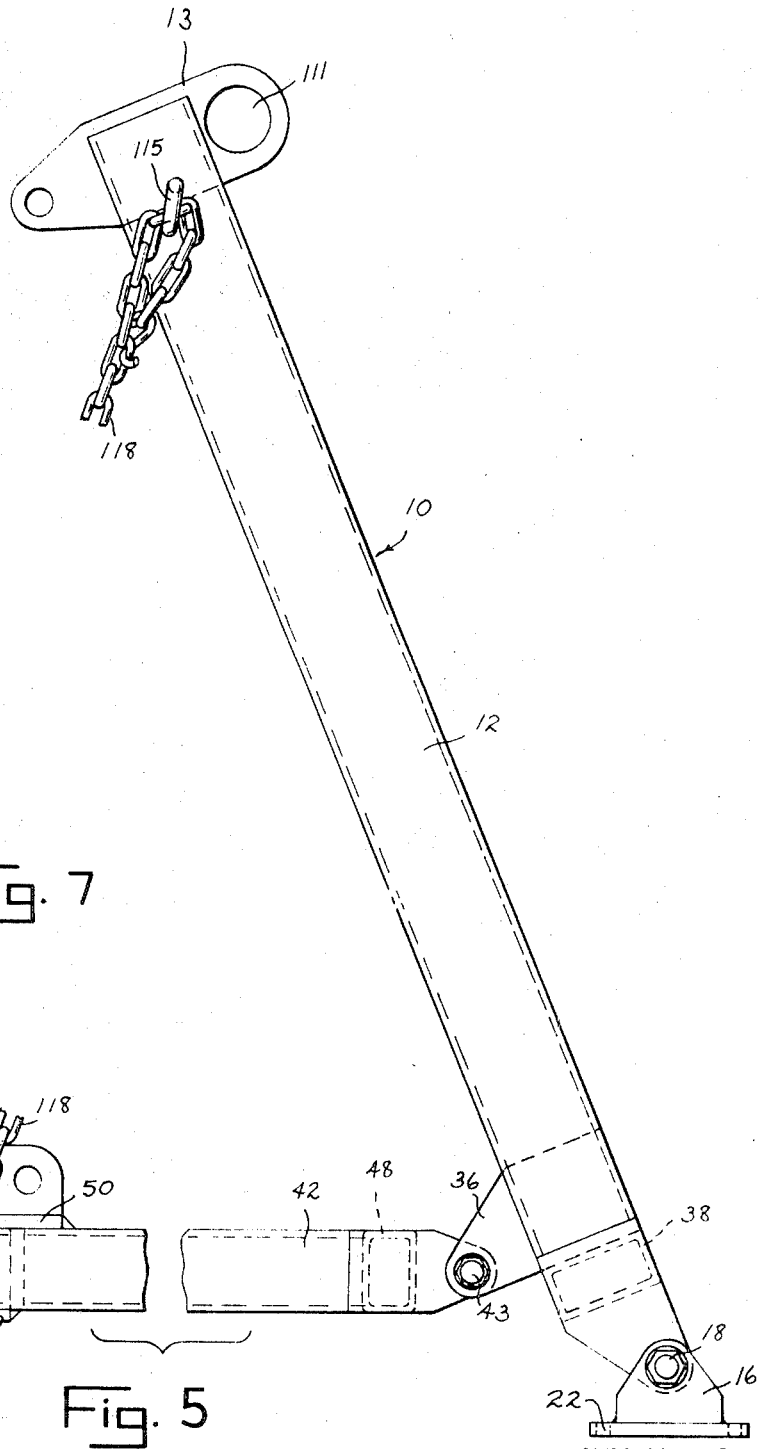

3,593,865

LIFT MOUNTABLE TO THE BED OF A PICK-UP TRUCK

SUMMARY OF THE INVENTION

This invention relates to a lift which is mountable to the bed of a pickup truck and which serves to convert the truck into a tow vehicle.

The lift of this invention includes an inverted V-shaped frame member having leg parts which are each adapted to be pivotally connected at the free end thereof to the bed of the truck, adjacent and substantially parallel to the rear edge thereof so as to enable the frame member to be pivoted in a fore and aft direction relative to the truck. A second frame member, adapted to extend rearwardly of the truck over the rear edge of the bed thereof, is connected to the inverted frame member by having the free end of each leg thereof pivotally connected to a corresponding inverted frame member leg part. An extensible-retractable power unit has one end pivotally connected to the apex of the inverted frame member and its other end pivotally connected to the second frame member and spaced from the pivotally connected ends of the second frame member legs. Hitch means is mounted to the apex of the second frame member. Actuating means is provided for causing the extension and retraction of the power unit which results in pivotal movement of the second frame member relative to the inverted frame member and a shifting of the hitch means.

The lift of this invention may be mounted to the bed of the truck with a minimum of effort. When not in use the lift can be folded back onto the bed of the truck and stored so as to allow maximum usage of the bed of the truck for other purposes.

Accordingly, it is an object of this invention to provide a lift which is mountable to the bed of a pickup truck for converting the truck into a tow vehicle and which can be stored in the bed of the truck without being detached therefrom when not in use so as to allow the truck bed to be used for other purposes.

Still another object of this invention is to provide a lift which is of economic construction and which is easily mountable to the bed of a pickup truck for converting the truck into a tow vehicle.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a side elevation showing the lift of this invention mounted to the bed of a pickup and in use.

FIG. 2 is a perspective view of the illustrated embodiment mounted to the bed of a pickup truck which is shown in broken lines.

FIG. 3 is a top plan view of the illustrated embodiment mounted to the bed of a pickup truck which is shown in broken lines.

FIG. 4 is a side elevation of the illustrated embodiment mounted to the bed of a pickup truck which is shown in broken lines.

FIG. 5 is a fragmentary enlarged view of the frame support members of the illustrated embodiment.

FIG. 6 is a sectional view taken along line 6–6 of FIG. 5.

FIG. 7 is a sectional view taken along line 7–7 of FIG. 6.

DESCRIPTION OF THE PREFERRED EMBODIMENT

The preferred embodiment illustrated is not intended to be exhaustive or to limit the invention to the precise form disclosed. It is chosen and described in order to best illustrate the principles of the invention and its application and practical use to thereby enable others skilled in the art to best utilize the invention.

Referring to FIGS. 2—5, the illustrated embodiment of this invention includes an inverted V-shaped frame member 10 having legs 12 joined at their upper ends to a connector plate 13 to form the apex 14 of the frame member. The lower or free ends of legs 12 are each pivotally connected to a bracket part 16 by means of a bolt 18 which passes through registering apertures in the free end part of each leg and bracket part and which is longitudinally secured therein by means of a nut. Each bracket part 16 is secured to a plate 22 which rests on the bed 24 of a truck shown in the FIGS. 2—4 in broken lines and designated by the numeral 26. Each plate 22 is preferably positioned adjacent rear edge 28 of truck bed 24 and over a longitudinal channel member 30 which constitutes a part of the frame of truck 26. Each plate 22 is anchored to the truck by means of a pair of U-bolts 32 which extend around the underlying channel member 30 and protrude upwardly through registering apertures in truck bed 24 and plate 22 and which are secured by means of nuts 34.

Frame member 10 includes a pair of spaced bracket parts 36 which are each secured, such as by welding, to the lower portion of a leg 12 adjacent the pivot connection of the leg to the truck bed. A transverse frame member 38 preferably interconnects legs 12 of frame member 10 at bracket parts 36.

A V-shaped frame member 40 is pivotally connected to frame member 10. Frame member 40 includes legs 42 which are joined at corresponding ends to form an apex 44. The opposite or free end of each leg 42 is pivotally connected to a bracket part 36 by means of a bolt 43 which extends through registering apertures in the bracket part and free end of the leg and which is longitudinally secured therein by means of a nut. A transverse frame member 48 preferably extends between and is connected to the pivotally connected ends of legs 42.

Plates 50 and 51 are welded or otherwise secured to opposite sides of frame member 40 at the apex 44 thereof. Plate 50 includes a projecting part 52 which extends outwardly therefrom. An extensible-retractable power unit, herein illustrated as a hydraulically actuated piston which is shiftably received within a cylinder 54 and which includes an actuator rod 54, is operatively connected between frame members 10 and 40. The free end of actuator rod 56 is pivotally connected to projecting part 52 at the apex of frame member 40, and cylinder 54 is pivotally connected to plate 13 at the apex 14 of frame member 10. Actuating means, such as a hydraulic pump 58, is operatively connected to the power unit cylinder 54. Pump 58 includes motor 60 which is preferably powered by the electrical system of the truck. Pump 58 is regulated by suitable valve and switch means well known in the art and is preferably located to the rear and at one side of truck bed 24. Actuation of motor 60 causes pump 58 to pump hydraulic fluid through conduits 59 into power unit cylinder 54, thereby causing extension and retraction of the actuator rod 56. Extension and retraction of the actuator rod could also be obtained by use of a common four-way valve as is well known in the art.

Referring to FIGS. 5—7, plates 50 and 51 each protrude beyond legs 42 of the frame member and define spaced end parts 66. A pivot pin 68 extends through end parts 66 of plates 50 and 51 and journals a connector member 70 positioned therebetween. A tow bar 63 is mounted to connector member 70 and includes a channel member 72 defined by two parallel sides 74 and an interconnecting web 76. A plate 78 extends the length of channel member 72 and is welded or otherwise secured to the outer margins of sides 74 of the channel member. A plate 80 is secured across the end of each channel member and in conjunction with plate 78 serves to define an elongated enclosed chamber 82 within the channel member. A flat bar 84 is disposed within chamber 82 and positioned against web 76 at approximately the middle of channel member 72. Bar 84 is welded to the bar at 85 and a bore 86 is formed in bar 84 and web 76 at midlength of the channel member. A pivot bar 88 extends with slight clearance through bore 86. A disc 90 is disposed within chamber 82 of the tow bar and is positioned between plate 78 and bar 84. Disc 90 includes a central aperture into which one end of pivot bar 88 protrudes. Disc 90 is welded to the protruding end of bar 88 by means of an internal circumferential weld at 92. A bearing plate 94 having a centrally located aperture 96 therein abuts the outer surface of web 76 of channel member 72 with the other end of pivot bar 88 protruding therethrough. Bar 88 is welded to bearing plate 94 where it protrudes from the plate. A pair of spaced tabs 98 straddle the protruding end of bar 88 and projects outwardly from bearing plate 94. Connector member 70 includes a protruding part 100 which is received with slight clearance between tabs 98 and which is pivotally connected thereto by means of pivot pin 102. As thus described, tow bar 63 is rotatable about bar 88 and is swivel-connected to frame member 40.

A bore 104 extends through one side 74 of channel member 72, bar 84 and connecting weld 85 to bore 86 so as to provide a means for lubricating bar 88. An oil cap 106 is threaded into the outer opening of bore 104. A hook 108 is mounted to each end plate 80 of tow bar 63.

Referring to FIGS. 2—5, a cable 110 extends through an aperture 111 in plate 13 at the apex of the frame member 10. The ends of cable 110 extend to the forward end of truck bed 24 and are fastened to hooks 112. Hooks 112 are secured to plates 114 which in turn are anchored to the bed of the truck by means of U-bolts which extend around channel members 30 of the truck as best illustrated in FIGS. 3 and 4. It is to be understood that while cable 110 has been illustrated as having its ends anchored to the forward part of the truck bed and having an intermediate portion operatively connected to the frame member 10, one end of the cable could be connected to the apex of frame member 10 and its opposite end anchored at a single point to the truck bed. A hook 115 is mounted to each leg 12 of frame member 10 adjacent the apex thereof. A hook 116 is mounted to each leg 42 of frame member 40 adjacent the apex thereof. A flexible connecting member, such as a chain 118, interconnects corresponding pairs of hooks 115 and 116 and serves to prevent unrestricted relative pivotal movement between frame members 10 and 40 and, if desired, to carry the load between frame members 10 and 40.

In mounting the lift of this invention to the bed of a pickup truck, suitable holes are first drilled in the bed of the truck adjacent the channel members thereof so as to permit U-bolts 32 to extend around the channel members 30 and anchor plates 22 and 114 to the bed of the truck. It is to be noted that when the lift is in its operative position, frame member 10 is tilted slightly rearwardly relative to truck 26 and maintained in that position by cable 110. When it is desired to store the lift, frame member 10 may be pivoted forwardly, causing a slackening of cable 110, until it is caused to rest upon the bed of the truck. Additionally, if desired, the power unit, consisting of cylinder 54 and actuator rod 56, may be removed from frame members 10 and 40 by removing retainer bolts 120 so as to enable frame member 40 to be folded downwardly.

The operation of the lift can best be understood by referring to FIGS. 1 and 4. Chain 118 is first disconnected from frame member 40 and frame member 40 lowered through actuation of pump 58 to the position illustrated in broken lines in FIG. 4 which preferably locates tow bar 63 at approximately the bumper level of a disabled vehicle 122. Chains or other securement means serve to anchor the bumper of the disabled vehicle 122 to the tow bar. Next, actuation of pump 58 serves to shift frame member 40 to the position illustrated in solid lines in FIG. 4 and to raise the front end of vehicle 122 from the ground. With frame member 40 in its upper or raised position, chains 118 are reconnected thereto and the frame member then preferably lowered until chains 118 carry the towed load between frame members 10 and 40.

What we claim is:

1. A lift mountable to the bed of a pickup truck for converting said truck into a tow vehicle comprising:
a first frame member having leg parts adapted to be pivotally connected at the lower ends thereof to said truck bed adjacent and substantially parallel to the rear edge thereof so as to enable said frame member to be pivoted to a fore and aft direction relative to said truck,
a second frame member having leg parts pivotally connected to the leg parts of said first member about a substantially horizontal axis substantially parallel to the pivot of said first frame member so as to be pivotal substantially vertically,
an extensible-retractable power unit for causing pivotal movement of said second frame member, said power unit having one end pivotally connected to said first frame member adjacent the free end thereof and having its opposite end pivotally connected to said second frame member and spaced from said pivotal axis thereof,
hitch means mounted to said second frame member and spaced from said pivotal axis thereof,
actuating means for causing extension and retraction of said power unit, and
support means connected to said first frame member for anchoring connection to said truck for limiting the pivotal aft movement of said first frame member.

2. The lift of claim 1 wherein said support means is a flexible member having one portion engaging said first frame member at said free end thereof and having another portion adapted for anchorage to said truck bed forwardly of the pivotal axis of said first frame member.

3. The lift of claim 1 and flexible connector means having one end anchored adjacent the free end of said first frame member and the other end anchored to said second frame member and spaced from said pivotal axis thereof.

4. The lift of claim 1, and a bracket pivotally connected to each leg part of said first frame member and adapted for anchoring to said truck bed.

5. The lift of claim 1 wherein said hitch means includes a tow bar swivel-connected to said second frame member.

6. The lift of claim 5 wherein said tow bar includes an elongated rigid member pivotally connected to a plate, said plate being swivel-connected to said second frame member.

7. The lift of claim 1 wherein said first frame member has an inverted V-shape and includes legs adapted to be pivotally connected at the divergent ends thereof to said truck bed.

8. The lift of claim 7 wherein said second frame member is V-shaped and includes legs each pivotally connected at the divergent end thereof to a corresponding leg of said first frame member.